(12) United States Patent
Woo et al.

(10) Patent No.: US 6,191,836 B1
(45) Date of Patent: *Feb. 20, 2001

(54) METHOD FOR FABRICATING A LIQUID CRYSTAL CELL

(75) Inventors: Joung Won Woo, Seoul; Kyeong Jin Kim, Bucheon-shi; Soon Bum Kwon; Ki Hyuk Yoon, both of Seoul; Young Seok Choi, Daejeon; Jong Hyun Kim; Jin Hee Jung, both of Seoul, all of (KR)

(73) Assignee: LG Philips LCD, Co., Ltd., Seoul (KR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/869,989

(22) Filed: Jun. 5, 1997

(30) Foreign Application Priority Data

Nov. 7, 1996 (KR) .................................................. 96-52665
Nov. 9, 1996 (KR) .................................................. 96-53173
Feb. 11, 1997 (KR) .................................................. 97-4280

(51) Int. Cl.$^7$ ................................................ G02F 1/1337
(52) U.S. Cl. ............................................................ 349/124
(58) Field of Search .................................... 349/129, 123, 349/124

(56) References Cited

U.S. PATENT DOCUMENTS

| | | | |
|---|---|---|---|
| 3,912,920 | 10/1975 | Kubota | 240/9.5 |
| 4,963,448 | 10/1990 | Ichimura et al. | 430/20 |

(List continued on next page.)

FOREIGN PATENT DOCUMENTS

| | | |
|---|---|---|
| 44 20 585 | 12/1995 | (DE) . |
| 197 03 682 | 8/1997 | (DE) . |
| 0 525 473 | 2/1993 | (EP) . |
| 0 525 478 | 2/1993 | (EP) . |
| 0 549 283 | 6/1993 | (EP) . |
| 0 635 748 A1 | 1/1995 | (EP) . |
| 0 708 354 | 4/1996 | (EP) . |
| 0 611 786 | 7/1996 | (EP) . |
| 0 742 471 | 11/1996 | (EP) . |
| 0 750 212 | 12/1996 | (EP) . |
| 0 788 012 A2 | 8/1997 | (EP) . |
| 0261712A1 | 3/1998 | (EP) . |
| 2 281 977 | 3/1995 | (GB) . |
| 2 286 893 | 8/1995 | (GB) . |
| 2 301 447 | 12/1996 | (GB) . |
| 2 309 793 | 8/1997 | (GB) . |
| 2 309 794 | 8/1997 | (GB) . |
| 2 310 048 | 8/1997 | (GB) . |

(List continued on next page.)

OTHER PUBLICATIONS

T. Hashimoto et al.; "41.4: TN–LCD with Quartered Subpixels Using Polarized UV–Light–Irradiated Polymer Orientation Films"; SID 95 Digest; pp. 877–880.

M. Schadt et al.; "Surface–Induced Parallel Alignment of Liquid Crystals by Linearly Polmerized Photopolymers"; Jpn. J. Appl. Phys. vol. 31 (1992) Pt. 1, No. 7, Jul. 1992; pp. 2155–2164.

(List continued on next page.)

Primary Examiner—Frank G. Font
Assistant Examiner—Michael P. Stafira
(74) Attorney, Agent, or Firm—Long, Aldridge & Norman LLP

(57) ABSTRACT

A method for fabricating a liquid crystal cell and related device includes providing an alignment layer of a light sensitive material on a substrate; and exposing the alighment layer to unpolarized or partially polarized light, to provide pretilt for the molecules of the alighment layer.

23 Claims, 20 Drawing Sheets

U.S. PATENT DOCUMENTS

| | | | |
|---|---|---|---|
| 4,974,941 | 12/1990 | Gibbons et al. | 350/349 |
| 5,032,009 | 7/1991 | Gibbons et al. | 350/341 |
| 5,073,294 | 12/1991 | Shannon et al. | 252/299.01 |
| 5,296,321 | 3/1994 | Kawanishi et al. | 430/20 |
| 5,389,698 | 2/1995 | Chigrinov et al. | 522/2 |
| 5,447,662 | 9/1995 | Herr et al. | 252/582 |
| 5,453,862 | 9/1995 | Toko et al. | 359/76 |
| 5,464,669 | 11/1995 | Kang et al. | 428/1 |
| 5,479,282 | 12/1995 | Toko et al. | 359/79 |
| 5,538,823 | 7/1996 | Park et al. | 430/20 |
| 5,539,074 | 7/1996 | Herr et al. | 526/326 |
| 5,576,862 | 11/1996 | Sugiyama et al. | 359/75 |
| 5,578,351 | 11/1996 | Shashidhar et al. | 428/1 |
| 5,602,661 | 2/1997 | Schadt et al. | 349/124 |
| 5,604,615 * | 2/1997 | Iwagoe et al. | 349/124 |
| 5,657,105 | 8/1997 | McCartney | 349/157 |
| 5,705,096 | 1/1998 | Kano et al. | 252/299.4 |
| 5,712,696 | 1/1998 | Toko et al. | 349/123 |
| 5,764,326 | 6/1998 | Hasegawa et al. | 349/124 |
| 5,767,994 | 6/1998 | Kang et al. | 359/72 |
| 5,784,139 | 7/1998 | Chigrinov et al. | 349/117 |
| 5,786,041 * | 7/1998 | Takenaka et al. | 428/1 |
| 5,824,377 | 10/1998 | Pirwitz et al. | 428/1 |
| 5,853,818 | 12/1998 | Kwon et al. | 427/510 |
| 5,856,430 * | 1/1999 | Gibbons et al. | 528/353 |
| 5,856,431 * | 1/1999 | Gibbons et al. | 528/353 |
| 5,859,682 * | 1/1999 | Kim et al. | 349/124 |
| 5,880,803 * | 3/1999 | Tamai et al. | 349/156 |
| 5,882,238 | 3/1999 | Kim et al. | 445/24 |
| 5,889,571 * | 3/1999 | Kim et al. | 349/124 |
| 5,909,265 | 6/1999 | Kim et al. | 349/129 |
| 5,928,561 | 7/1999 | Bryan-Brown et al. | 252/299.4 |
| 5,982,466 | 11/1999 | Choi et al. | 349/124 |

FOREIGN PATENT DOCUMENTS

| | | |
|---|---|---|
| 2 317 964 | 4/1998 | (GB) . |
| 2319093 | 5/1998 | (GB) . |
| 64-60833 | 3/1989 | (JP) . |
| 1-251344 | 10/1989 | (JP) . |
| 1-251345 | 10/1989 | (JP) . |
| 2-55330 | 2/1990 | (JP) . |
| 2-298917 | 12/1990 | (JP) . |
| 3-36527 | 2/1991 | (JP) . |
| 03-120503 | 5/1991 | (JP) . |
| 03-241311 | 10/1991 | (JP) . |
| 4-7520 | 1/1992 | (JP) . |
| 4-284421 | 10/1992 | (JP) . |
| 4-350822 | 12/1992 | (JP) . |
| 05-019208 | 1/1993 | (JP) . |
| 5-34699 | 2/1993 | (JP) . |
| 5-53513 | 3/1993 | (JP) . |
| 5-232473 | 9/1993 | (JP) . |
| 7-56173 | 3/1995 | (JP) . |
| 7-261185 | 10/1995 | (JP) . |
| 07-318861 | 12/1995 | (JP) . |
| 07-318942 | 12/1995 | (JP) . |
| 8-334790 | 12/1996 | (JP) . |
| 09-211465 | 8/1997 | (JP) . |
| 9-211468 | 8/1997 | (JP) . |
| 09265095 | 10/1997 | (JP) . |
| 09318946 | 12/1997 | (JP) . |
| 10-090684 | 4/1998 | (JP) . |
| 10-154658 | 6/1998 | (JP) . |
| 10-161126 | 6/1998 | (JP) . |
| 10-332932 | 12/1998 | (JP) . |
| 11-194344 | 7/1999 | (JP) . |
| 11-194345 | 7/1999 | (JP) . |
| 94/28458 | 12/1994 | (WO) . |
| WO 95/18989 | 7/1995 | (WO) . |
| WO 95/22075 | 8/1995 | (WO) . |
| WO 95/34843 | 12/1995 | (WO) . |
| 96/22561 | 7/1996 | (WO) . |
| 99/08148 | 2/1999 | (WO) . |

OTHER PUBLICATIONS

W. Gibbons, et al., *Surface–mediated alignment of nematic liquid crystals with polarized laser light*, Letters to Nature, vol. 351, May 2, 1991, pp. 49 & 50.

Martin Schadt, *Surface–Induced Parallel Alignment of Liquid Crystals by Linearly Polymerized Photopolymers*, Jpn. J. Appl. Phys. vol. 31 (1992), Part 1, No. 7, Jul. 1992.

Yasufumi Iimura, et al., *Alighment Control of a Liquid Crystal on a Photosensitive Polyvinylalcohol Film*, Jpn. J. Appln. Phys. vol. 32 (1993), Part 2, No. 1A/B, Jan. 15, 1993.

Kunihiro Ichimura, *Photocontrol of Liquid Crystal Alignment*, 1993.

T. Marushii, et al., *Photosensitive Orientants for Liquid Crystal Alignment*, Mol. Mat. 1993, vol. 3, pp. 161–168.

Y. Toko, et al., *TN–LCDs Fabricated by Non–Rubbing Showing Wide and Homogeneous Viewing Angular Characteristics and Excellent Voltage Holding Ratio*, SID 93 Digest, pp. 622–625.

P. Shannon, et al., *Patterned optical properties in photopolymerized surface–aligned liquid–crystal films*, Letters to Nature, vol. 368, Apr. 7, 1994, pp. 532 & 533.

Y. Iimura, et al., *Inveited Address: Electro–Optic Characteristics of Amorphous and Super–Multidomain TN–LCDs Prepared by a Non–Rubbing Method*, SID 94 Digest, pp. 915–918.

M. Schadt, et al., *Photo–Generation of Linearly Polymerized Liquid Crystal Aligning Layers Comprising Novel, Integrated Optically Patterned Retarders and Color Filters*, Jpn. J. Appl. Phys. vol. 34 (1995), pp. 3240–3249, Part 1, No. 6A, Jun. 1995.

A. Lien, et al., *UV modification of surface pretilt of alignment layers of multidomain liquid crystal displays*, Appl. Phys. Lett. 62 (21), Nov. 20, 1995, pp. 3108–3111.

M. Hasegawa, *Nematic Homogeneous Photo Alignment by Polyimide Exposure to Linearly Polarized UV*, Journal of Photopolymer Science and Technology, vol. 8, No. 2, 1995, pp. 241–248.

M. Schadt, *Investigation of the Mechanism of the Surface--Induced Alignment of Liquid Crystals by Linearly Polymerized Photopolymers*, SID 95 Digest, pp. 528–531.

J. West, et al., *Polarized UV–Exposed Polyimide Films for Liquid–Crystal Alignment*, SID 95 Digest, pp. 703–705.

T. Hashimoto, et al., *TN–LCD with Quartered Subpixels Using Polarized UV–Light–Irradiated Polymer Orientation Films*, SID 95 Digest, pp. 877–880.

T. Saitoh, et al., *A New Hybrid N–TB Mode LCD with Two Domain Pixels Fabricated Using a Photopolymer*, Asia Display 95, pp. 589–592.

A. Lien, *UV–Type Two–Domain Wide Viewing Angle TFT/LCD Panels*, Asia Display, pp. 593–596.

T. Yamamoto, *Liquid–Crystal Alignment by Slantwise Irradiation of Non–Polarized UV Light on a Polyimide Layer*, SID 96 Digest, pp. 642–645.

M. Schadt, et al., *Optical patterning of multi–domain liquid–crystal displays with wide viewing angles*, Letters to Nature, vol. 381, May 16, 1996.

J. Chen, *Model of liquid crystal alignmnet by exposure to linearly polarized ultraviolet light*, Physical Review E, vol. 54, No. 2, Aug. 1996, pp. 1599–1603.

H. Soh, et al., *The Realization of Wide Viewing Angle TFT–LCDs using Photo–Alignment Method*, Euro Display 96, pp. 579–582.

J. Chen, *Mechanism of Liquid–Crystal Alignment by Polyimide Exposure to Linearly Polarized UV Light*, SID 96 Digest, pp. 634–637.

K. Lee, et al., *Late–News Poster: Mechanism of UV Modification of LC Pretilt Angle and Its Application to Two–Domain TN–LCDs*, SID 96 Digest, pp. 638–641.

J. Kim, et al., *Late–News Poster: Photo–Alignment of Liquid Crystals Using a New Photopolymer*, SID 96 Digest, pp. 646–649.

Y. Saitoh, et al., *Stability of UV–Type Two–Domain Wide–Viewing–Angle TFT–LCD Panels*, SID 96 Digest, pp. 662–665.

D. Seo, et al., *Invited Address: Surface Alignment of Liquid Crystals in LCDs*, SID 93 Digest, pp. 954–956.

Y. Iimura, *Invited Paper: Prospects of the Photo–Alignment Technique for LCD fabrication*, SID 97 Digest, pp. 311–314.

R. Shashidhar, et al., *A New Non–Rubbing Technique for Liquid–Crystal Alignment*, SID 97 Digest, pp. 315–318.

M. Schadt, et al., *Invited Paper: Optical Patterning of Multidomain LCDs*, SID 97 Digest, pp. 397–400.

K. Han, et al., *A Study on the Photo–Alignment of the Polymer–Containing Cinnamate Group Using a New Single UV–Exposure Method*, SID 97 pp. 707–710.

F. Yamada, et al., *Late–News Poster: A New Photo–Alignment Scheme for LC–Cell Pretilt Control*, SID 97 Digest, pp. 715–718.

M. Nam, et al., *Wide–Viewing–Angle TFT–LCD with Photo–Aligned Four–Domain TN Mode*, SID 97 Digest, pp. 933–936.

*SID 95 DIGEST*, "41.4: TN–LCD with Quartered Subpixels Using Polarized UV–Light–Irradiated Polymer Orientation Films," by T. Hashimoto et al., Stanley Electric Co., Ltd., Kanagawa, JP, pp:877–80 (1995).

*JPN J APPL PHYS, Vol. 35, (1996), Part 2, No. 10A, 1 Oct. 1996*, "Tilting of Liquid Crystal through Interaction with Methyl Orange Molecules Oriented by Circularly Polarized Light," by Tong Kun Lim et al., Department of Physics Korea University, Seoul, Korea, pp: L1281–3.

*SID 96 DIGEST*, "P–55: Liquid–Crystal Alignment by Slantwise Irradiation of Non–Polarized UV Light on a Polyimide Layer," by T. Yamamoto et al., Toshiba Corp., Yokohama, Japan, pp: 642–5 (1996).

LIM et al.;"*Tilting of Liquid Crystal through Interaction with Methyl Orange Molecules Oriented by Circularly Polarized Light*"; JP Journal of Applied Physics; Vol. 35; 10/1996; pp. 1281–1283.

Eugene HECHT; "*OPTICS*"; 1987; pp. 298–299.

\* cited by examiner

METHOD FOR FABRICATING A LIQUID CRYSTAL CELL

BACKGROUND OF THE INVENTION

The present invention relates to a method for fabricating a liquid crystal cell, and more particularly to a method for fabricating a liquid crystal cell in which the liquid crystal molecules are aligned by irradiating light.

Generally, a liquid crystal cell comprises two substrates and liquid crystal materials injected between these substrates, the liquid crystal materials comprising anisotropic molecules. It is necessary to orderly align liquid crystal molecules in the cell in order to obtain a uniform brightness and high contrast ratio in the liquid crystal cell. Therefore, some treatment on the substrate is carried out to provide orderly alignment of liquid crystal molecules. In FIG. 1, the director of liquid crystal molecule n is determined by a pretilt angle $\theta$ which corresponds to a polar angle of the director n and a pretilt angle direction $\phi$ which corresponds its azimuthal angle. The Cartesian coordinate of the director n of liquid crystal molecule is defined:
n=(cos$\theta$cos$\phi$, cos$\theta$sin$\phi$, sin$\theta$).

The director n of liquid crystal is determined by controlling the pretilt angle $\theta$ and the pretilt angle direction $\phi$ by carrying out alignment process on the substrate. In this specification, the director n is substituted with a pretilt defining a pretilt angle and pretilt angle direction.

A conventional alignment process is the rubbing method demonstrated in FIG. 2. The rubbing process comprises following steps: coating a substrate 11 with an alignment layer 12 such as polyamide; and mechanically rubbing the alignment layer(FIG. 2a). Thereby, microgrooves with pretilt $\theta_p$ are formed on rubbed surface of the alignment layer (FIG. 2b). The liquid crystal molecules are thus uniformly aligned due to the intermolecular interaction between the polyimide molecules and the liquid crystal molecules.

In the above described rubbing process, however, defects are formed in the microgrooves which cause light scattering and random phase distortion. Also during the rubbing process, dust particles and electrostatic discharges are generated on the alignment layer, so that the substrate is damaged and yield is decreased.

To solve the aforementioned problems, the photoalignment method has been recently introduced. The conventional photo-alignment method is illustrated in FIG. 3. In this method, double exposure of linearly polarized light is necessary to determine a pretilt. FIG. 3a shows the first irradiation process in which linearly polarized ultraviolet light is vertically irradiated into an alignment layer 12. When polymers are irradiated with the light having the polarized direction ⊙ parallel with side chains of the polymers, cross-linking is generated between the side chains belonging different polymers. The reacted polymer becomes symmetric due to the side chains as well as the main chains of the polymer; the main chains are arranged in a perpendicular direction to the polarized direction ⊙ of light. Thereby, two pretilt directions $\theta_1$, $\theta_2$ are determined in the perpendicular direction to the polarized direction ⊙ of the light as shown FIG. 3a. However, the formed pretilt angle is small, typically less than 0.11°, and one pretilt direction is to be selected, so a second exposure must be carried out as shown in FIG. 3b.

The second irradiation process is shown in FIG. 3b. The linearly polarized light having a polarized direction ↔ perpendicular to the first polarized direction ⊙, is irradiated into the alignment layer 12 in the oblique direction $\theta$ relative to the normal line of alignment layer 12. Thereby, one pretilt angle direction $\theta_1$ is selected and the pretilt angle is enlarged according to the oblique angle between the substrate 11 and incident direction of the second ultraviolet light. For example, when the oblique angle is 45°, the pretilt angle is set 0.26°.

The photo-alignment method has several advantages over rubbing. For example, it can prevent the defects of rubbing such as a light scattering and random phase distortion. Also during the alignment process, dust particles and electrostatic discharges are not generated in the alignment layer, so that the substrate is not damaged.

The conventional photo-alignment method, however, is complicated due to double-exposure. In addition, the range of controllable pretilt angle by the second ultraviolet light is very limited, for example, 0.15° when the oblique angle is 30°, 0.26° when the oblique angle is 45°, 0.30° when the oblique angle is 60°.

SUMMARY OF THE INVENTION

An object of the present invention is to provide a photo-alignment method in which the process is simple and applicable to various modes of liquid crystal cells by controlling the pretilt angle in all ranges of 0°–90°.

Another object of the present invention is to provide a method for fabricating a liquid crystal cell which has a wider viewing angle.

In order to achieve these and other objects, a method, as embodied and broadly defined herein, comprises providing an alignment layer, preferably of a photosensitive material, on a substrate; and exposing the alignment layer to unpolarized or partially polarized light in an oblique direction with respect to the alightment layer, to provide pretilt for the molecules of the alightment layer.

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Further, the direction of the pretilt of the liquid crystal molecules in each of the four domains may be substantially perpendicular to that of at least one adjacent ones of the four domains.

FIG. 4 is a schematic showing the characteristic of light according to the intensity of each electromagnetic wave in the P and S directions. In the figure, the P-direction and S-direction are used to illustrate the relative intensity of each light. The P-direction and S-direction are perpendicular to one another.

Figure 1:
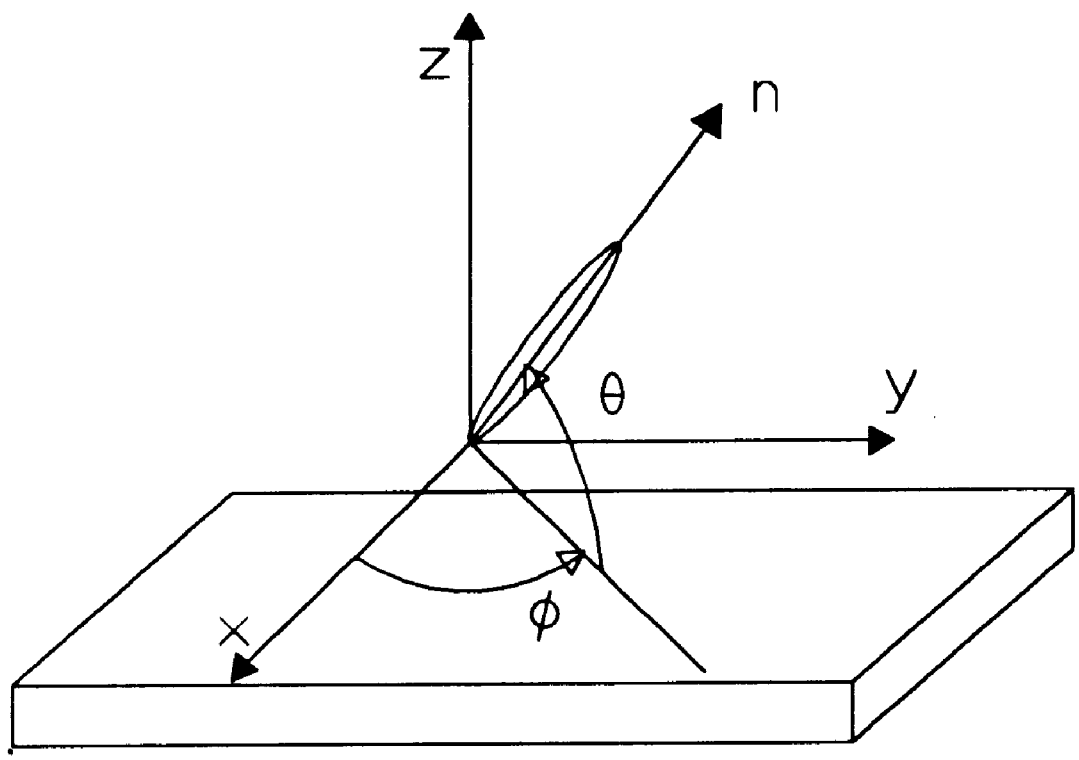
FIG. 1 illustrates a liquid crystal director in Cartesian coordinates.
Figure 2A:
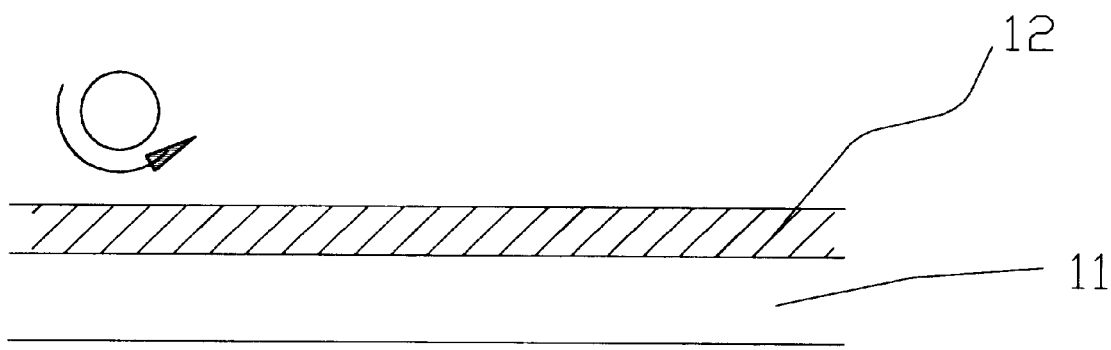
FIGS. 2a to 2b illustrate a conventional rubbing alignment process.
Figure 2B:
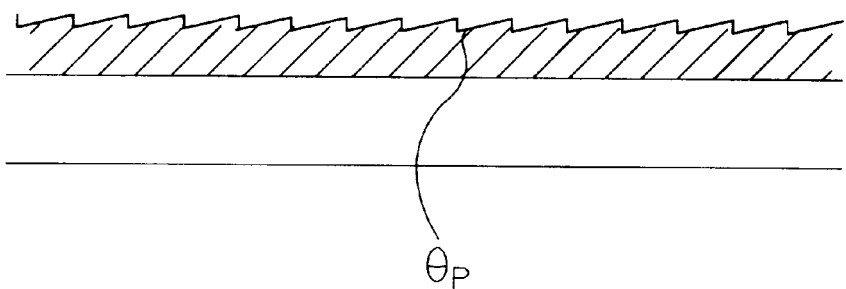
Figure 3A:
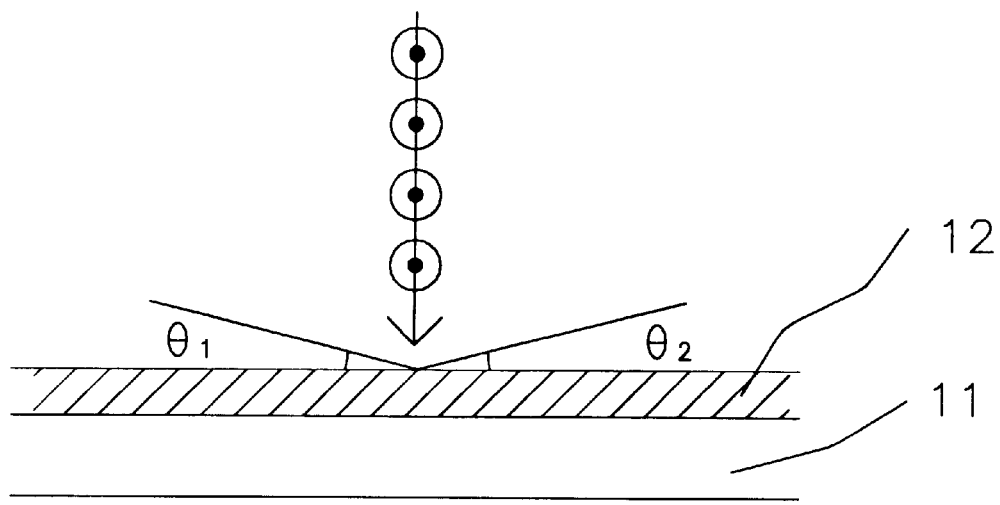
FIGS. 3a to 3c illustrate a conventional photo-alignment.
Figure 3B:
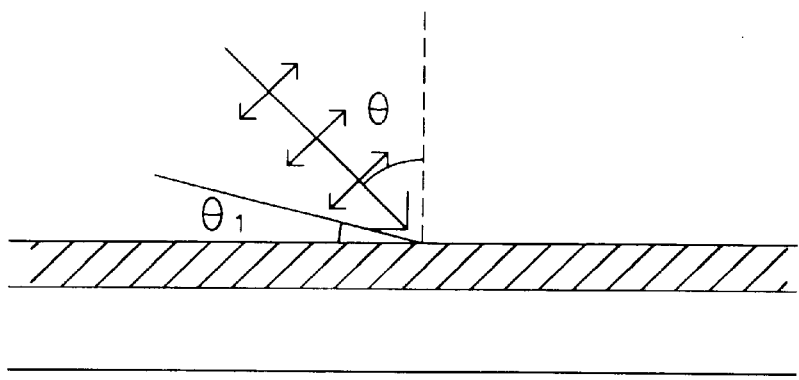
Figure 3C:
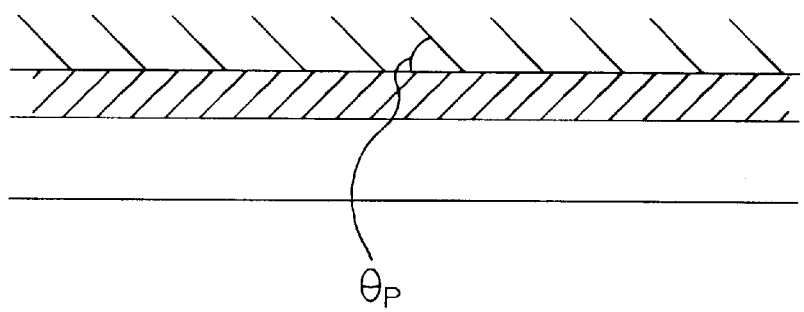
Figure 4A:
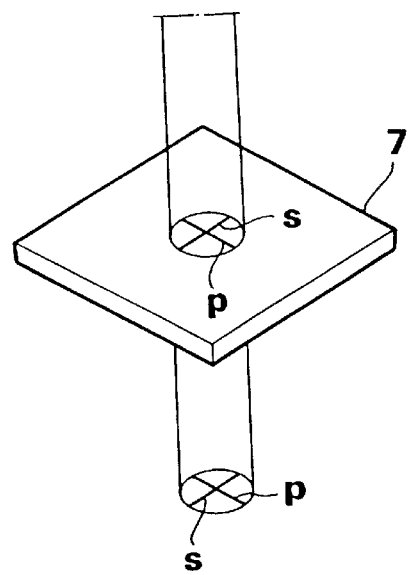
FIGS. 4a to 4c show the polarized characteristics of lights.

Unpolarized light in this specification is defined as a collection of omnidirected electromagnetic waves oscillating in all directions, so that it has electromagnetic waves oriented in every direction except the incident direction. FIG. 4a shows unpolarized light transmitting through a transparent plate 7 which passes all incident electromagnetic waves. The unpolarized light has equivalent intensities in the P and S directions, or, in other words, the unpolarized light is constituted of omnioriented electromagnetic waves.

Figure 4B:
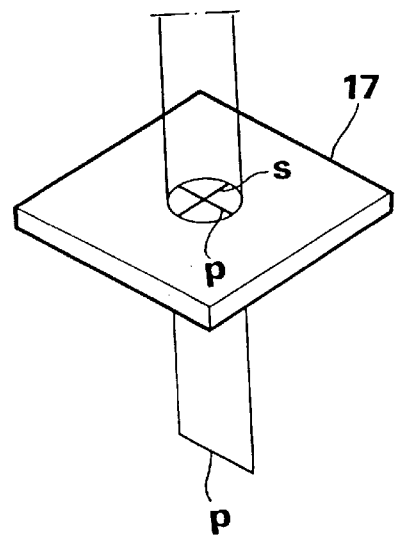

On the other hand, the polarized light is defined as a collection of unidirected oscillating electromagnetic waves. FIG. 4b demonstrates polarized light transmitting through a polarizer 17 which allows only electromagnetic waves directed parallel to the transmissive axis of the polarizer 17 to pass. Therefore, the polarized light includes only undirected electromagnetic waves.

Figure 4C:
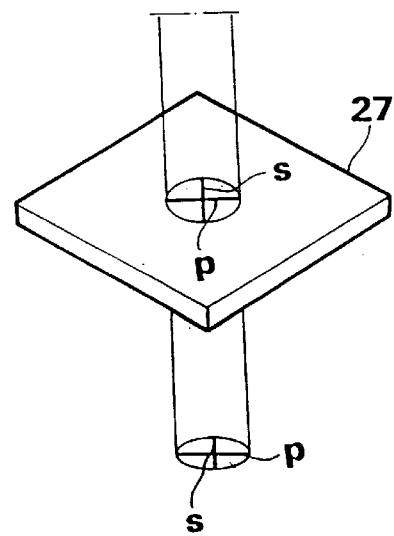

Finally, partially polarized light is defined in this specification as light having an elliptically shaped intensity in which a principal intensity is stronger than other intensities. In other words, the intensity of the principal electromagnetic wave P is strongest, and the subordinate electromagnetic wave S oriented perpendicular to the principal electromagnetic wave is weakest. FIG. 4c illustrates partially polarized light transmitting through a partially polarizing plate 27 which allows the intensity of waves parallel to the principal transmission axis to pass unimpeded, but partially blocks the intensity of waves oriented in other directions. Therefore, the partially polarized light is comprised of a principal intensity P and a subordinate intensity s, smaller than the principal intensity P.

This invention utilizes unpolarized and partially polarized light to align liquid crystal molecules injected into a liquid crystal cell. To align the liquid crystal molecules, an alignment layer or photoreactive layer should be coated on the substrates constituting the liquid crystal. According to this invention, the alignment layer includes light sensitive (photosensitive) material which is readily aligned in the direction perpendicular to the polarized direction of the incident light. In this manner, the pretilt angle directions are determined in the directions perpendicular to the polarized direction of the incident light. In addition, the materials have pretilt forming characteristics controllable in the entire range of 0–90 degrees.

The photosensitive material of this invention includes oligomers and polymers of siloxane cinnamates having the following structural formulas.

polysiloxane cinnamate I:

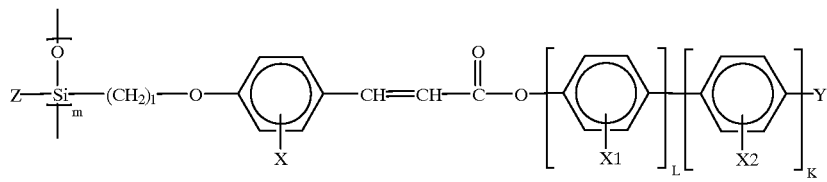

polysiloxane cinnamate II:

Z=OH, $CH_3$, or mixtures thereof,
m=10–100,
l=1–11,
L=0 or 1,
K=0 or 1,
X, $X_1$, $X_2$, Y=H, F, Cl, CN, $CF_3$, $C_nH_{2n+1}$ or $OC_nH_{2n+1}$
  wherein n can be

Figure 5A:
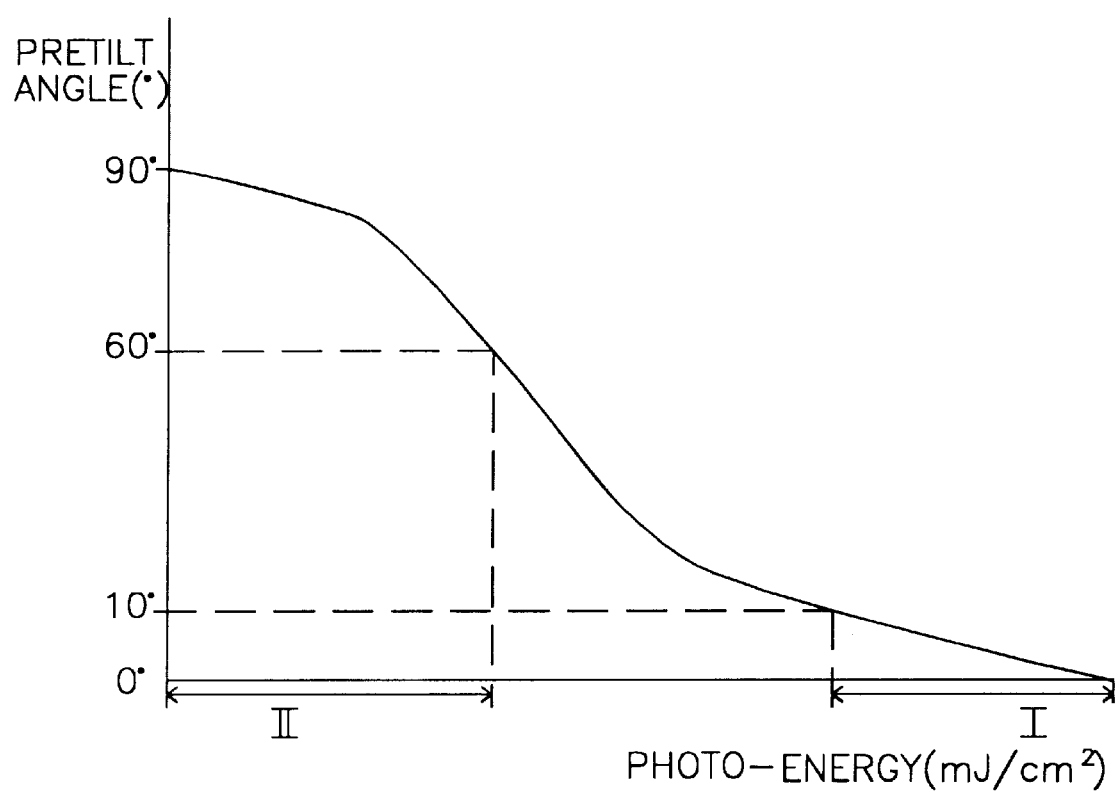
FIGS. 5a to 5b show the relationship between pretilt angle and photo-energy in the siloxane materials.
Figure 5B:
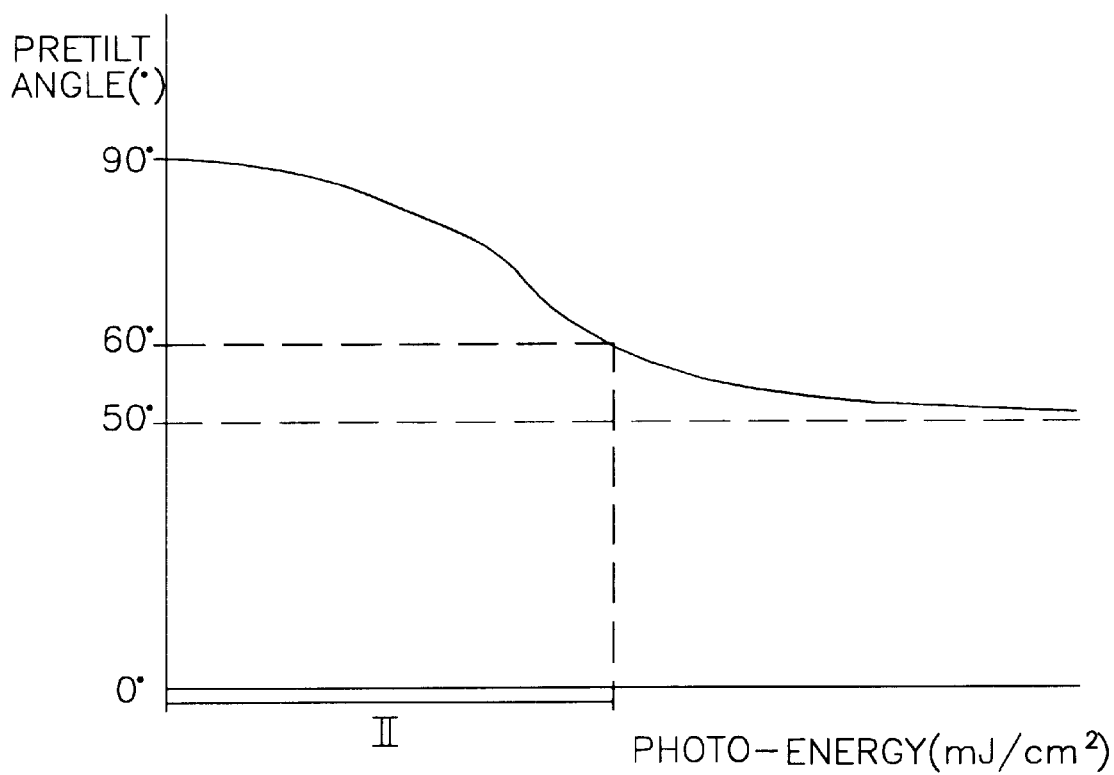

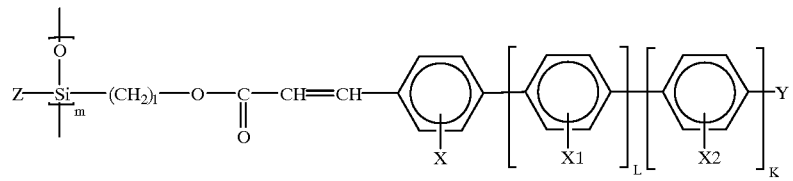

fro m 1 to 10, or mixtures thereof;

The pretilt angle forming characteristics of these materials is shown in FIG. 5a and FIG. 5b. FIG. 5a shows the pretilt angle forming characteristics of siloxane polymers. The material has a pretilt angle of 90 degree without providing any photo-energy. By irradiating with light, the pretilt angle is slowly decreased, in the range I, down to 60°. The pretilt angle is more rapidly decreased down to about 10° by increasing photo-irradiation energy between range II and range I, and then is slowly decreased in range II.

FIG. 5b shows the pretilt angle forming characteristics of siloxane oligomers. The material has a pretilt angle of 90 degrees without providing any photo-energy. By irradiating with light, the pretilt angle is slowly decreased in the range II, down to about 60°, and then continues to be decreased to about 50° with increasing photo-irradiation energy. By using these materials as an alignment layer, the pretilt angle can be easily controlled through a broad range.

Figure 6A:
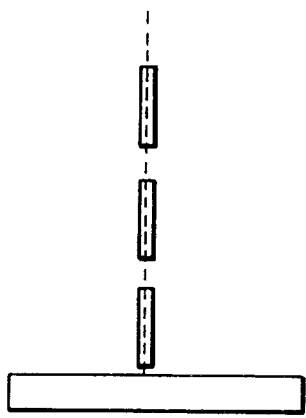
FIGS. 6a to 6c show various alignment modes capable of being provided by an alignment process according to the invention.
Figure 6B:
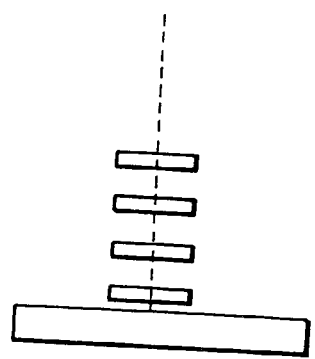
Figure 6C:
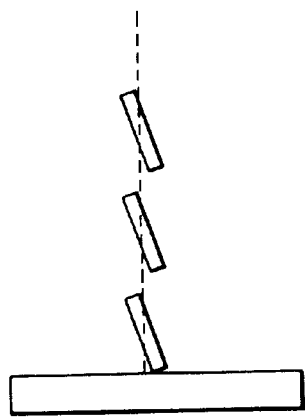

Therefore, the various alignment modes are formed as shown in FIG. 6. FIG. 6a shows a homogeneous alignment mode having a pretilt angle less than 10°, FIG. 6b shows a homeotropic alignment mode having a pretilt angle greater than 60°. In addition, a tilted alignment mode having a pretilt angle between 10° and 60° can be produced as illustrated in 6c.

The alignment method of present invention can be adapted to all kinds of liquid crystal cells by controlling the various pretilt angles as described above.

Figure 7A:
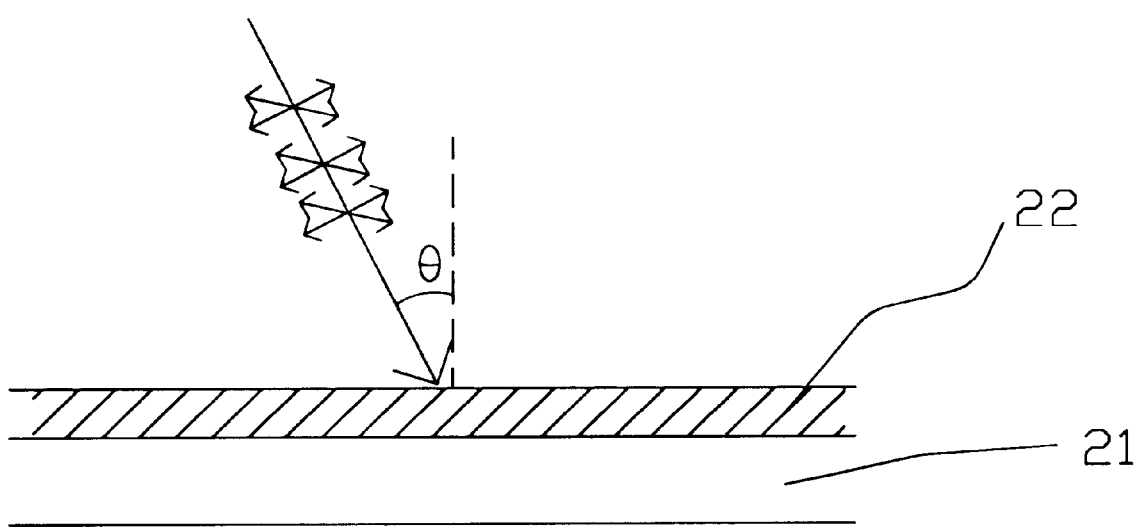
FIGS. 7a to 7b illustrate an alignment process according to this invention.
Figure 7B:
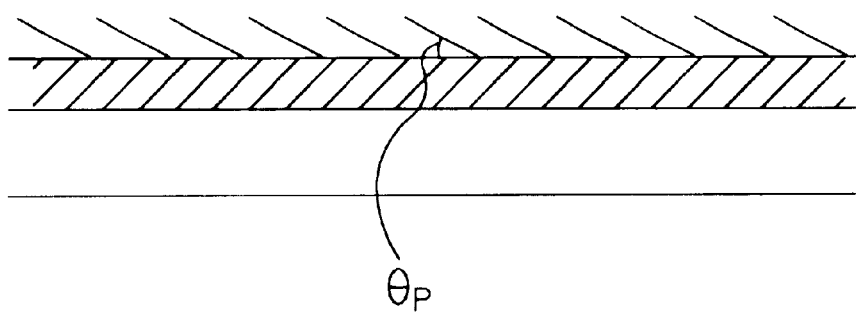

One alignment method of this invention is illustrated in FIG. 7. In this embodiment, unpolarized light having an omnidirected electromagnetic wave is utilized to provide a pretilt by single exposure. This light has electromagnetic waves oscillating in all directions except the incident direction; therefore, cross linking is not generated in the incident direction. In FIG. 7a, the unpolarized light is irradiated onto an alignment layer 22 formed with siloxane materials with an angle θ from the normal line of the alignment layer. Thereby, the pretilt angle direction is selected in the direction of the incident light, and pretilt angle is controlled by the photo-energy of the light. As shown in FIG. 7b, one pretilt $θ_p$ is provided on the alignment layer.

To save photo-energy, the preferred mode of liquid crystal cell is a homeotropic alignment mode. To achieve this mode, the range II of photo-energy is applied to alignment layer when the alignment layer is formed with siloxane polymers as shown in FIG. 5a. Similarly, when the siloxane oligomers is used for alignment layer as shown in FIG. 5b, the range II of photo-energy is applied. In this embodiment, a polarizer polarizing a light can be excluded in the irradiating device. Also, because the alignment process is completed in a single exposure, rearranging of the irradiating device is not necessary. Therefore, the process is simple due to single exposure, and is more energy efficient.

Figure 8A:
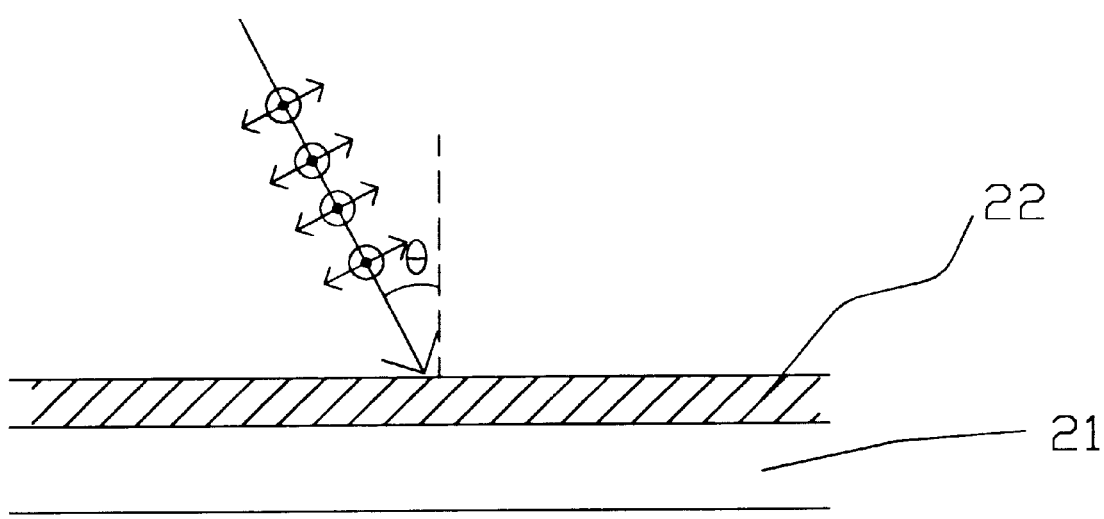
FIGS. 8a to 8b illustrate another alignment process according to this invention.

Another alignment method of this invention is illustrated in FIG. 8. In this embodiment, partially polarized light having subordinate electromagnetic wave components as well as a principal electromagnetic wave component is utilized to provide a pretilt by single exposure. In this method, the subordinate components perpendicular to principal components serve to select a pretilt angle direction. The principal components provide the pretilt angle direction axis. In FIG. 8a, partially polarized light is irradiated onto alignment layer 22 formed with siloxane materials with an angle θ from normal line of the alignment layer. In this manner, two pretilt angle directions are determined in the direction perpendicular to the principal direction. At the same time, subordinate components produce one pretilt angle direction in the incident direction θ.

Figure 8B:
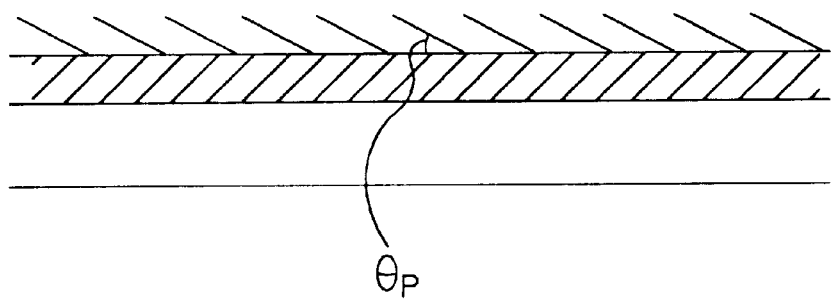

The pretilt angle is also controlled by the photo-energy of the light. As shown in FIG. 8b, one pretilt $θ_p$ is provided on the alignment layer.

A stable alignment by principal components can be achieved. Therefore, this process can be adapted to the homogeneous mode as well as the homeotropic mode.

Figure 9:
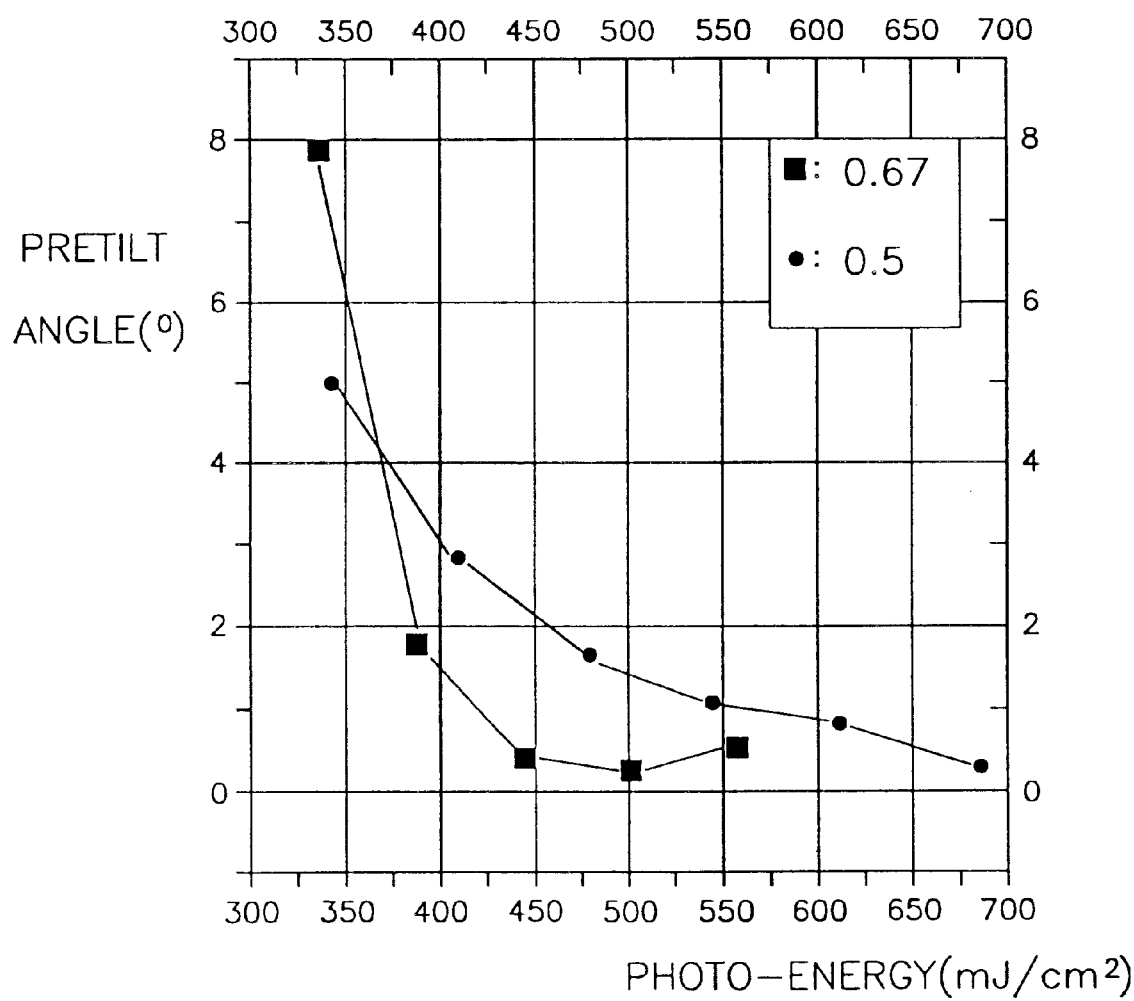
FIG. 9 shows the relationship between pretilt angle and photo-energy according to the polarization degree.

In addition, the pretilt angle sharpness depends upon the degree of polarization of partially polarized light as shown in FIG. 9.

By adopting the alignment processes discussed above, various modes of liquid crystal cells of FIG. 10 may be produced depending the configuration between the first pretilt of first alignment layer and the second pretilt of a second alignment layer facing the first alignment layer.

Figure 10A:
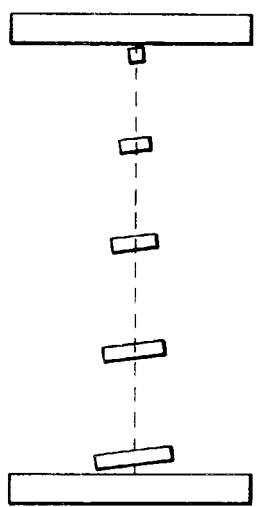
FIGS. 10a to 10e show various liquid crystal modes capable of being provided by a fabricating process according to the invention.
Figure 10B:
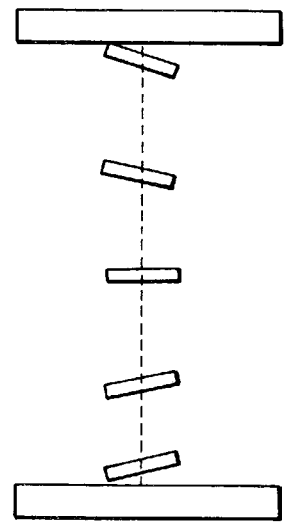
Figure 10C:
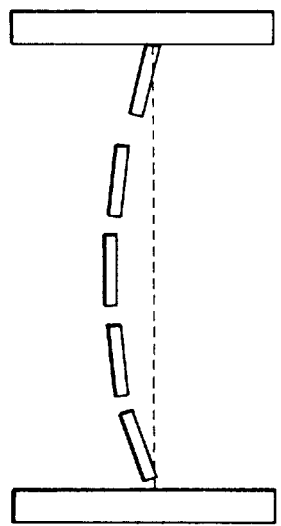
Figure 10D:
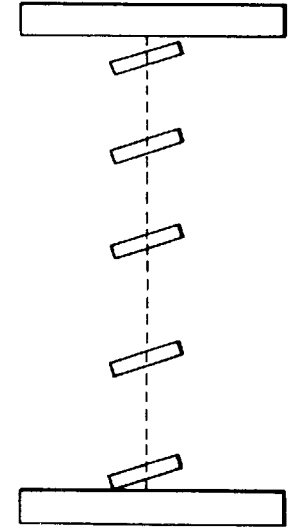
Figure 10E:
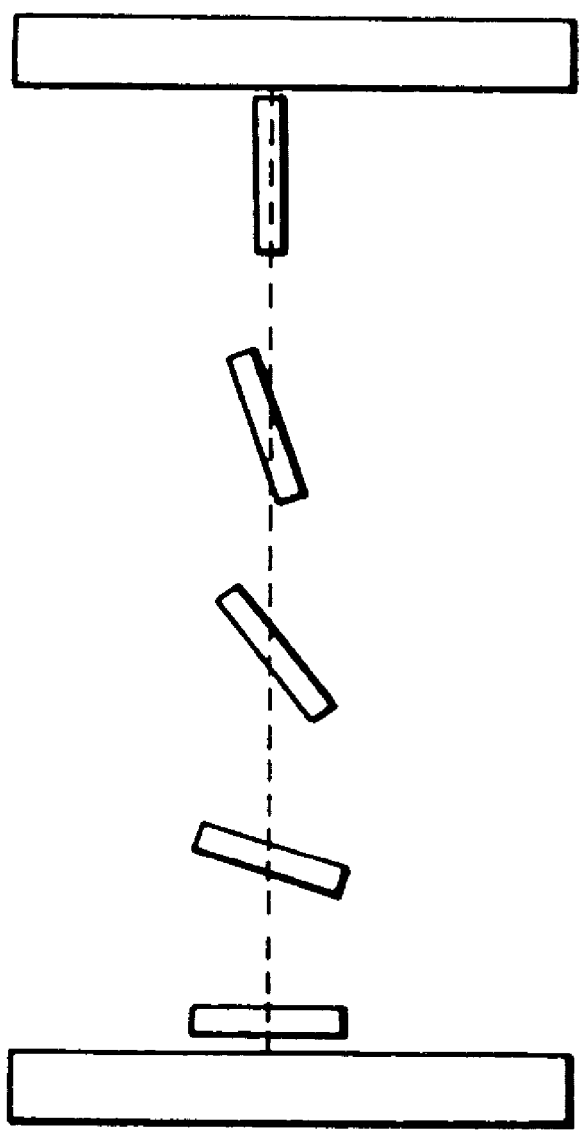

FIG. 10a illustrates a TN mode liquid crystal cell in which a pretilt angle direction of one alignment layer is perpendicular to a pretilt angle direction of the other alignment layer. FIG. 10b and FIG. 10c illustrate a spray mode and a bend mode liquid crystal cell, respectively. In these modes, a pretilt angle direction of one alignment layer is antiparallel with a pretilt angle direction of the other alignment layer. FIG. 10d illustrates an ECB mode liquid crystal cell in which the pretilt angle direction of one alignment layer is parallel with a pretilt angle direction of the other alignment layer. Finally, FIG. 10e shows a hybrid mode liquid crystal cell having one alignment layer aligned in a homeotropic mode and the other alignment layer aligned in a homogeneous mode.

A mono-domain liquid crystal cell has the problem of viewing angle dependency. To overcome this and other problems, this invention provides a fabricating method of multi-domain liquid crystal cells shown in FIG. 11 through FIG. 14.

FIG. 11 demonstrates one embodiment of this invention which provides a multi-domain ECB mode liquid crystal cell aligned parallel between two substrates 21 and has a pretilt angle greater than 60°. FIG. 11a shows a method for providing a first pretilt on a first domain I on the alignment layer 22. The first unpolarized light is obliquely irradiated in the angle $θ_1$ into the substrate 21 coated with alignment layer 22 of siloxane polymers while being blocked from the second domain II in FIG. 11a and FIG. 11b, the cross-sectional view of the FIG. 11a, so as to provide a first pretilt on the first domain I. The first pretilt is defined with a first pretilt angle being larger than 60° relative to the substrate and a pretilt angle direction oriented to the incident light direction.

Figure 11A:
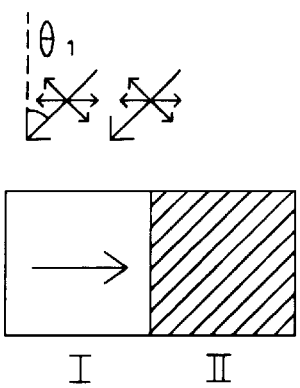
FIGS. 11a to 11h illustrate a process of fabricating a multi-domain liquid crystal cell.
Figure 11B:
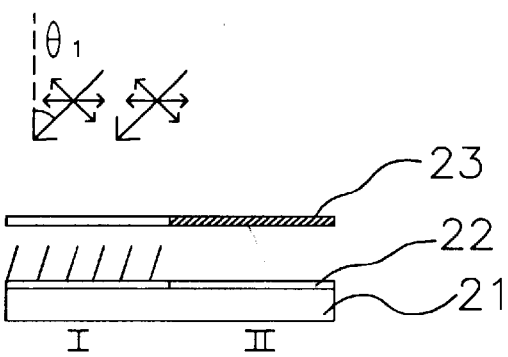
Figure 11C:
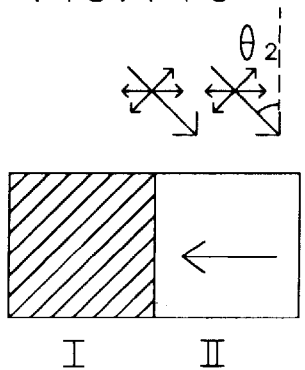
Figure 11D:
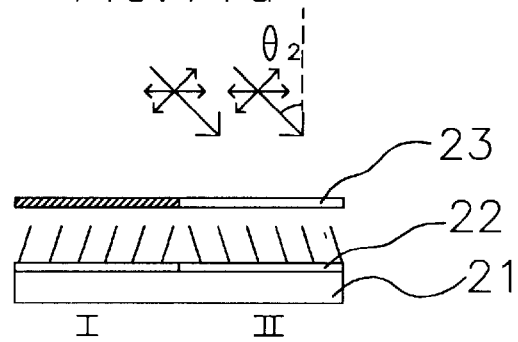

FIG. 11c and FIG. 11d show the method for providing a second pretilt on a second domain II on the alignment layer 22. To get the second pretilt, the mask 23 is moved to the first domain I. The second unpolarized light is obliquely irradiated with the angle $θ_2$ into the alignment layer 22 while being blocked from the first domain I, so as to provide a second pretilt on the second domain II.

Figure 11E:
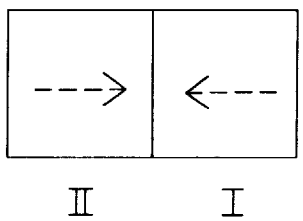
Figure 11F:
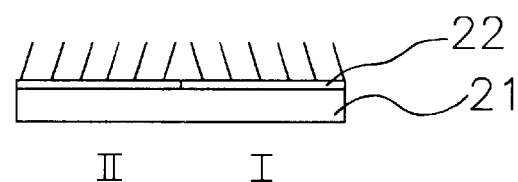

A second substrate 21 is coated with alignment layer 22 and provided with the first pretilt and the second pretilt on the first domain and the second domain, respectively, as shown in FIG. 11e. The pretilts are tilted towards each other on the alignment layer 22 as shown in FIG. 11f, the cross sectional view of FIG. 11e.

Figure 11G:
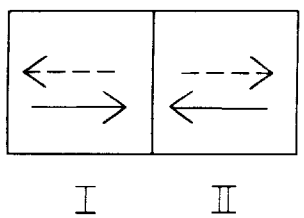
Figure 11H:
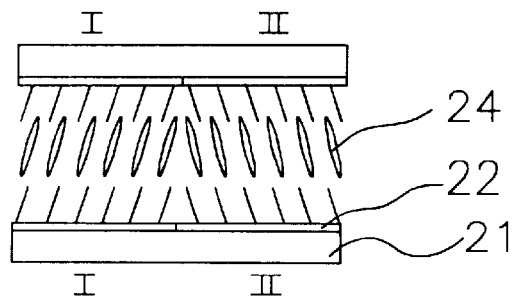

A liquid crystal panel is then obtained by assembling the two substrates 21 for an ECB mode liquid crystal cell. Liquid crystal materials 24 are injected into the liquid crystal panel having two domains, then liquid crystal molecules 24 are vertically aligned between the two substrates 21. At the same time, the molecules in one domain are aligned parallel to the column of the cell cross-section, but in the row, the molecules of liquid crystal materials are aligned in different directions according to domains as shown in FIG. 11g and FIG. 11h.

In this manner, the viewing angle is increased by aligning the liquid crystal molecules according to their domains so as to get a wider viewing angle liquid crystal cell. Further, the direction of the second pretilt may be substantially perpendicular to that of the first pretilt.

In this embodiment, the photo-irradiation energy is selected so that the said first pretilt and said second pretilt are set to be larger than 60°, or more preferably, 75°–89°. That is, when the siloxane based materials are used as the alignment layer, the range "II" of photo-energy is applied to get a pretilt angle greater than 60°, as shown in FIG. 5a and FIG. 5b. Thus the large pretilt angle is easily provided for the ECB mode liquid crystal cell by adopting this alignment process.

Figure 12A:
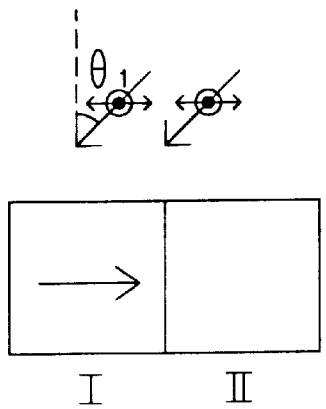
FIGS. 12a to 12h show another process of fabricating a multi-domain liquid crystal cell.
Figure 12B:
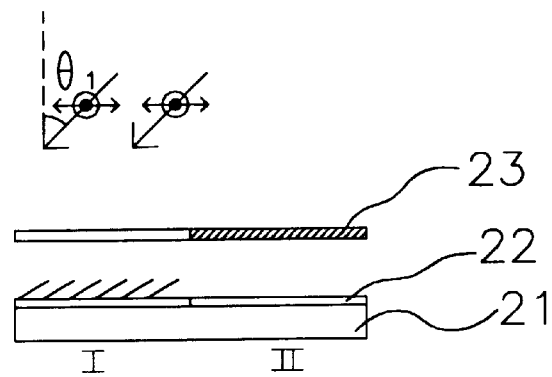
Figure 12C:
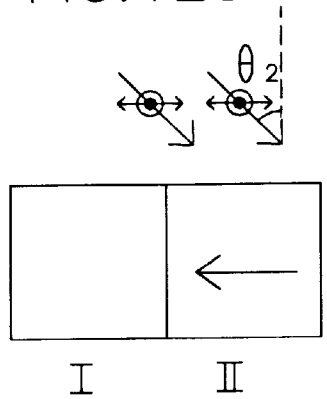
Figure 12D:
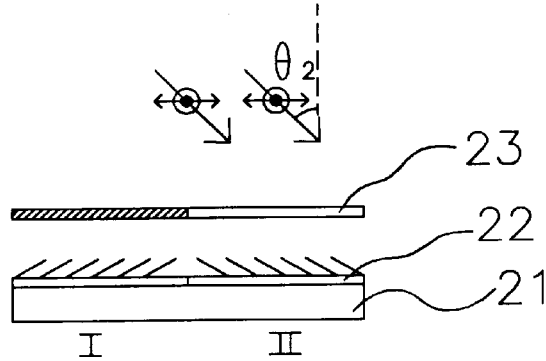

FIGS. 12a to 12h show another embodiment of this invention which provides a multi-domain TN mode liquid crystal cell which is aligned twistedly between two substrates and has a pretilt angle less than 10°. FIG. 12a shows the method for providing a first pretilt on a first domain I on the alignment layer 22. The first partially polarized light is obliquely irradiated in the angle $\theta_1$ into alignment layer 22 of siloxane polymer while being blocked from the second domain II in FIG. 12a and FIG. 12b, so as to provide a first pretilt on the first domain I. The first pretilt is defined with a first pretilt angle being less than 10° relative to the substrate 21 and a pretilt angle direction oriented to the incident light direction. FIG. 12c and FIG. 12d show the method for providing a second pretilt on a second domain II on the alignment layer 22. To get the second pretilt, the mask 23 is moved to the first domain I. The second unpolarized light is obliquely irradiated with the angle $\theta_2$ into the alignment layer 22 while being blocked from the first domain I, so as to provide a second pretilt on the second domain II.

Figure 12E:
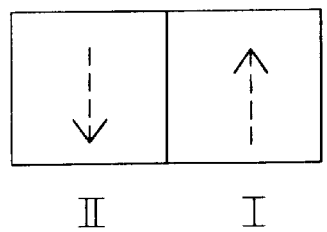
Figure 12F:
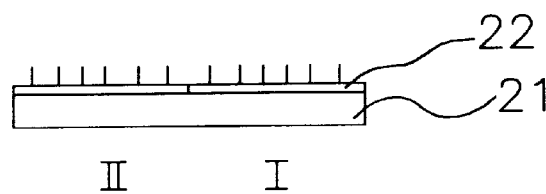

The second substrate 21 is coated with alignment layer 22 and provided with the first pretilt and the second pretilt on the first domain and the second domain respectively as shown in FIG. 12e. The pretilts are tilted in planes parallel to one another on the alignment layer 22 as shown in FIG. 12f, the cross sectional view of FIG. 12e.

Figure 12G:
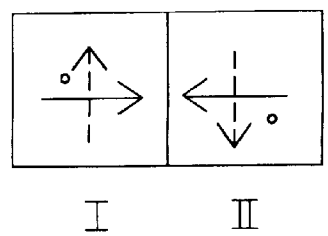
Figure 12H:
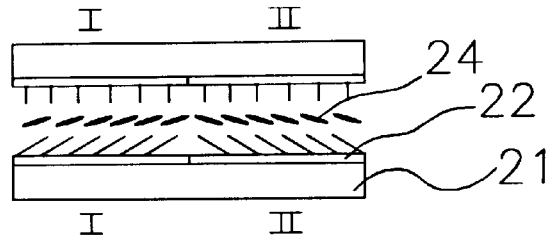

Then, a liquid crystal panel can be obtained by assembling the two substrates 21 for TN mode liquid crystal cell. Liquid crystal materials 24 are injected into the liquid crystal panel having two domains, then liquid crystal molecules 24 are horizontally aligned between the two substrates 21. At the same time, the molecules in one domain are twistedly aligned in the column of the cell cross-section, but in the row, the molecules of liquid crystal materials are aligned in different direction according to domains as shown in FIG. 12g and FIG. 12h.

Thereby, the viewing angle is increased by aligning the liquid crystal molecules according to their domains so as to get a wider viewing angle liquid crystal cell. Further, the direction of the second pretilt may be substantially perpendicular to that of the first pretilt.

In this embodiment, the photo-irradiation energy is selected so that the first pretilt and the second pretilt are set to be less than 10°. That is, when the siloxane based materials are used as the alignment layer, the range "I" of photo-energy is applied to get a pretilt angle greater than 10°, as shown in FIG. 5a.

Thus, a stable pretilt alignment axis is easily provided by the principal wave of the partially polarized light. In addition, the pretilt angle sensitivity is controlled by the degree of polarization of the partially polarized light as shown in FIG. 9.

FIG. 13 illustrates a process for fabricating a four-domain ECB mode liquid crystal cell which produces a wider viewing angle than a two-domain ECB mode cell. In FIG. 13a and FIG. 13b, the cross-sectional view of FIG. 13a, the first unpolarized light is obliquely irradiated in the angle $\theta_1$ into the substrate 21 coated with alignment layer 22 of siloxane polymer materials while being blocked from the second, third, and fourth domains II, III, IV, so as to determine the first pretilt on the first domain I, the pretilt having angle larger than 60°. To get the second pretilt having angle larger than 60°, the second unpolarized light is obliquely irradiated in the angle $\theta_2$ into the substrate 21 while being blocked from the first, third, and fourth domains I, III, IV as shown in FIG. 13c and FIG. 13d. To get the third and fourth pretilt having pretilt angle larger than 60°, as shown in FIG. 13e, FIG. 13f, FIG. 13g and FIG. 13h, a third unpolarized light and a fourth unpolarized light are obliquely irradiated on a third domain III and a fourth domain IV, respectively, while being blocked from other domains. In FIG. 13i, after removing the mask, the first substrate having four domains for a liquid crystal panel is obtained.

Figure 13A:
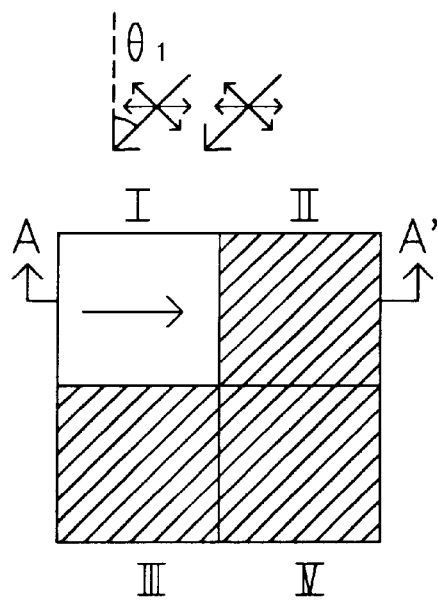
FIGS. 13a to 13j show yet another process of fabricating a multi-domain liquid crystal cell.
Figure 13B:
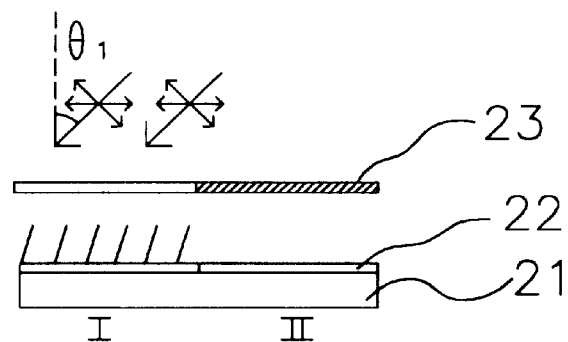
Figure 13C:
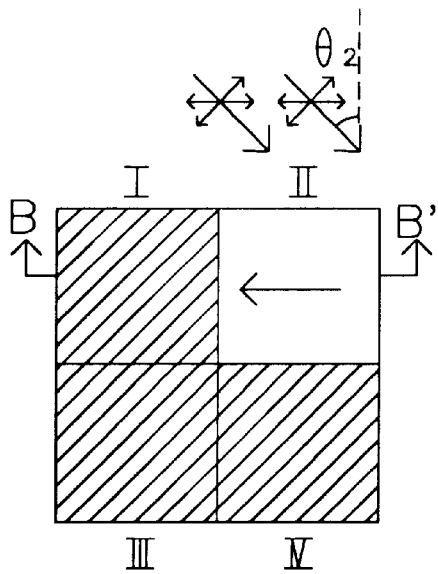
Figure 13D:
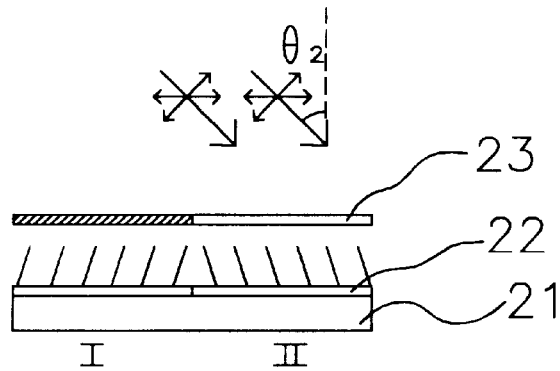
Figure 13E:
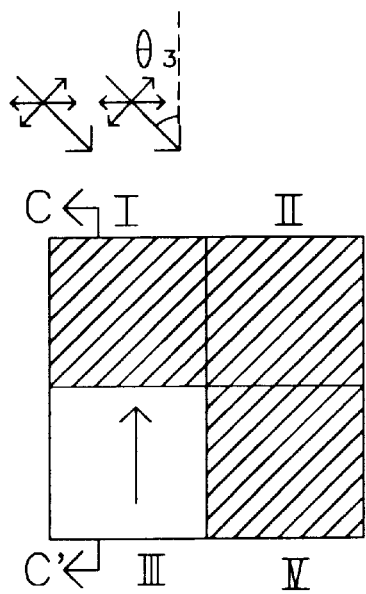
Figure 13F:
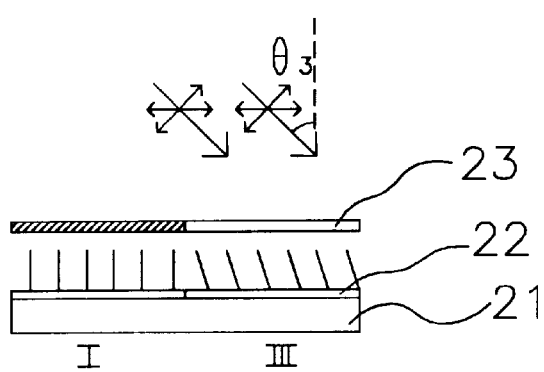
Figure 13G:
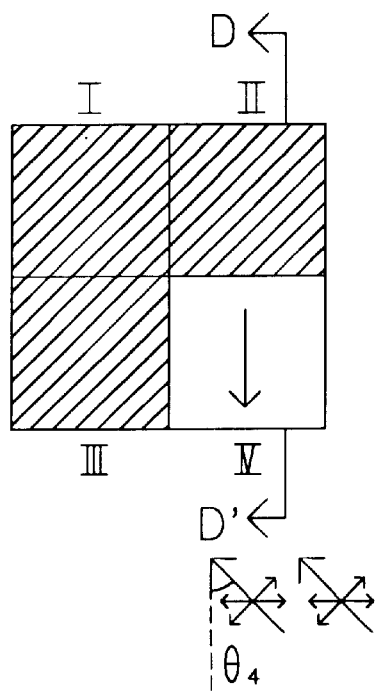
Figure 13H:
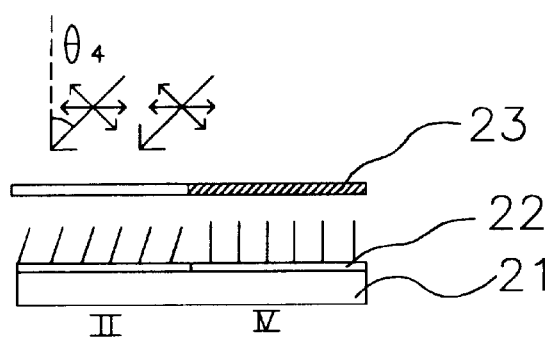
Figure 13I:
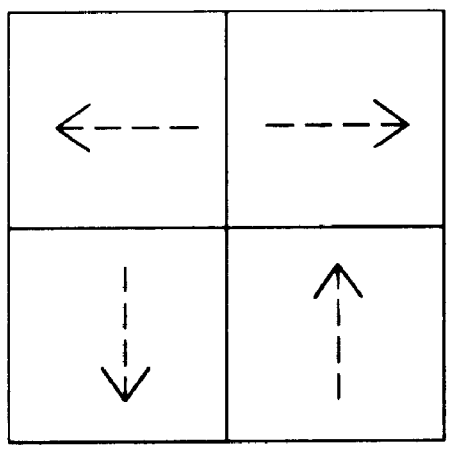
Figure 13J:
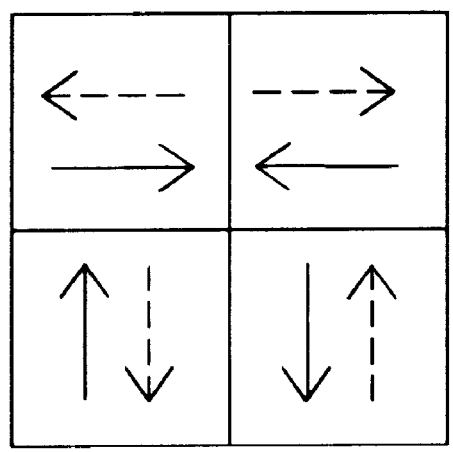

The above photo-alignment process is carried out on another, second substrate 21 and a liquid crystal panel is obtained by assembling the two substrates 21. Liquid crystal materials are injected into the liquid crystal panel having four domains, then liquid crystal molecules are vertically aligned. At the same time, molecules are aligned parallel to the column of the cell cross-section, but in the row, the molecules of liquid crystal materials are aligned in the different directions between domains as shown in FIG. 13j.

Thereby, the viewing angle is increased by aligning the liquid crystal molecules according to their domains so as to get a wider viewing angle liquid crystal cell. Further, the direction of the pretilt of the liquid crystal molecules in each of the four domains may be substantially perpendicular to that of at least one of adjacent ones of the four domains.

In this embodiment, the photo-irradiation energy for providing first pretilt angle, second pretilt angle, third pretilt angle and fourth pretilt angle is selected in the range II of FIG. 5a or FIG. 5b, so that the pretilt angle is larger than 60°, and more preferably, larger than 75° but less than 89°.

The present invention provides a method of fabricating an ECB mode liquid crystal cell which can be obtained in short time by the photo-alignment process. Moreover, it can provide a multi-domain ECB mode liquid crystal cell by changing the incident direction of the photo-irradiation. Thus, an ECB mode cell having a wider viewing angle, a higher contrast ratio and a more stable grey scale is easily fabricated by the photo-alignment process of this invention. The large pretilt angle for the ECB mode is readily provided by adopting an alignment layer of this invention. Therefore, a photo-alignment process is completed in a shorter time so that total tact time is shorter than conventional method.

Figure 14A:
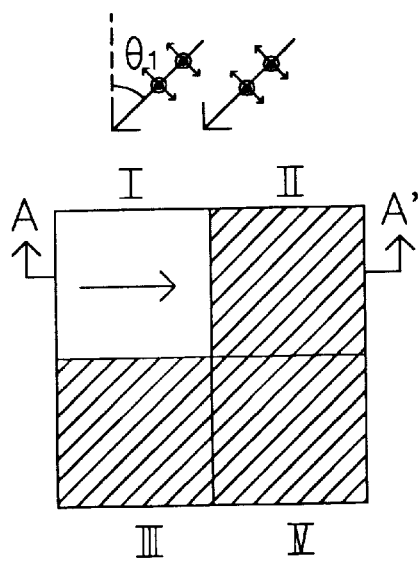
FIGS. 14a to 14j show yet another process of fabricating a multi-domain liquid crystal cell.
Figure 14B:
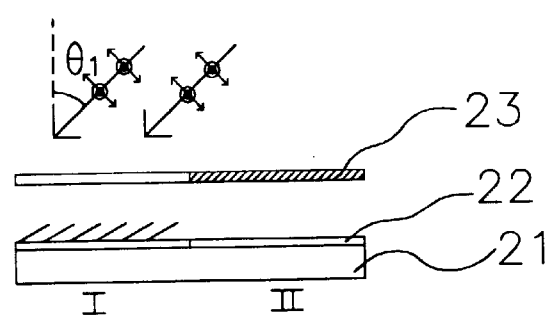
Figure 14C:
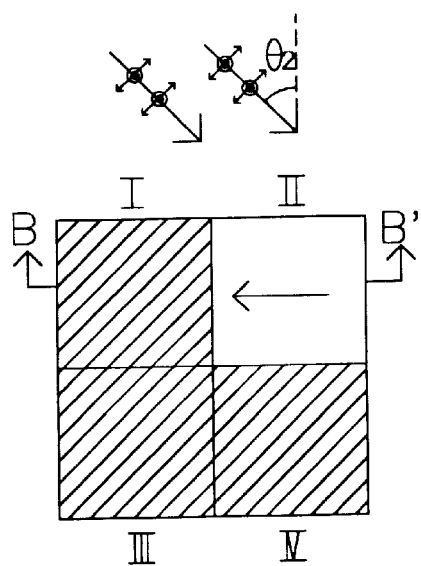
Figure 14D:
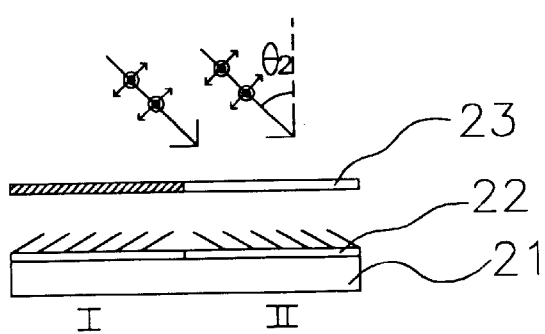
Figure 14E:
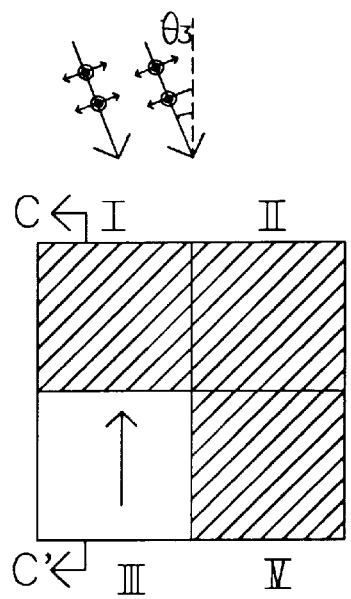
Figure 14F:
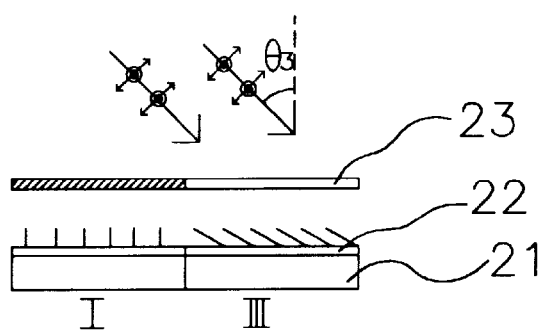
Figure 14G:
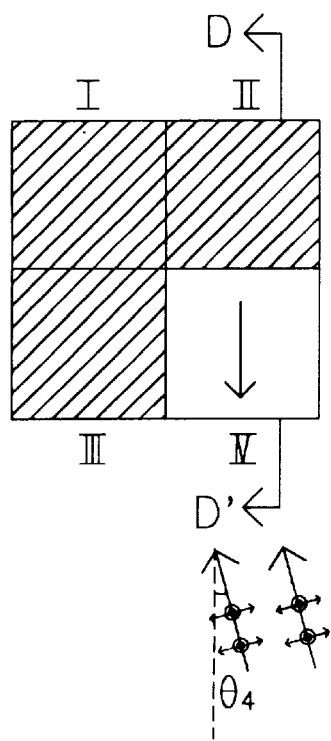
Figure 14H:
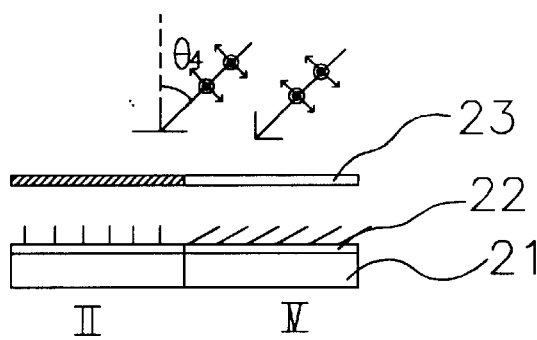

FIG. 14a through FIG. 14j show a process for fabricating a four-domain TN mode liquid crystal cell having a wider viewing angle than a two-domain TN mode cell. In FIG. 14a and FIG. 14b, the cross-sectional view of FIG. 14a, the first partially polarized light is obliquely irradiated in the angle $\theta_1$ into the substrate 21 coated with an alignment layer 22 of siloxane polymer materials while being blocked from the second, third, and fourth domains II, III, IV, so as to determine the first pretilt on the first domain I, the pretilt having an angle less than 10°. To get the second pretilt having angle less than 10°, the second partially polarized light is obliquely irradiated in the angle $\theta_2$ into the substrate 21 while being blocked from the first, third, and fourth domains I, III, IV as shown in FIG. 14c and FIG. 14d. To get the third and fourth pretilts having pretilt angle less than 10°, as shown in FIG. 14e, FIG. 14f, FIG. 14g and FIG. 14h, a third partially polarized light and a fourth partially polarized light are obliquely irradiated a third domain III and a fourth domain IV, respectively, while being blocked from other domains. Therefore, the first substrate 21 having four domains for a liquid crystal panel can be produced.

Figure 14I:
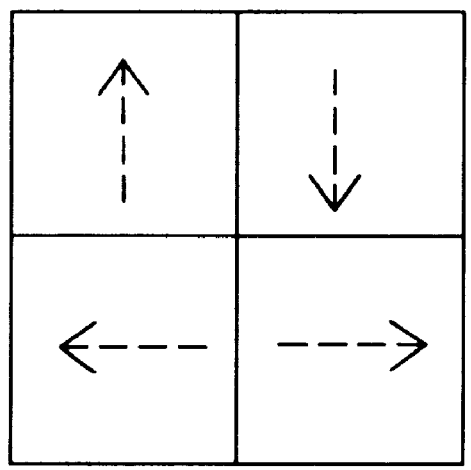

The above photo-alignment process is carried out on another substrate 21 to prepare the second substrate as sown in FIG. 14i.

Figure 14J:
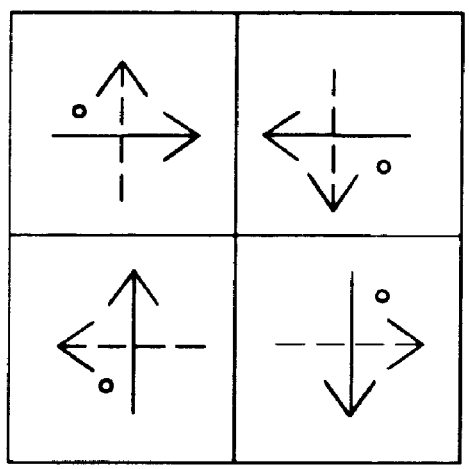

After assembling the two substrates 21, liquid crystal materials are injected into the liquid crystal panel having four domains, then liquid crystal molecules are horizontally aligned. At the same time, molecules are twistedly aligned in the column of the cell cross-section, but in the row, the molecules of liquid crystal materials are aligned in the different directions between domains as shown in FIG. 14j.

Thereby, the viewing angle is increased by aligning the liquid crystal molecules according to their domains so as to get a wider viewing angle liquid crystal cell. Further, the direction of the pretilt of the liquid crystal molecules in each of the four domains may be substantially perpendicular to that of at least one of adjacent ones of the four domains.

In this embodiment, the photo-irradiation energy for providing the first pretilt angle, second pretilt angle, third pretilt angle and fourth pretilt angle is set up in the range I of FIG. 5a, so that the pretilt angle is less than 10°.

Thus, a stable pretilt alignment axis is easily provided by principal wave of the partially polarized light. In addition, the pretilt angle sensitivity is controlled by the degree of polarization of partially polarized light as shown in FIG. 9.

Therefore, a photo-alignment process is completed in a shorter time so that total tact time is shorter than conventional methods. In each of the above embodiments of the invention, the liquid crystal material may include a positive or negative dielectric anisotrophy.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of manufacturing a liquid crystal display device, comprising:
   providing an alignment layer on a substrate; and
   exposing said alignment layer to light obliquely incident onto a surface of said alignment layer to form a pretilt angle, the exposing step simultaneously selecting a direction of the pretilt angle and an amount of the pretilt angle.

2. A method of manufacturing a liquid crystal device in accordance with claim 1, wherein said alignment layer includes a siloxane based polymer.

3. A method of manufacturing a liquid crystal device in accordance with claim 1, wherein said alignment layer includes a siloxane based oligomer.

4. A method of manufacturing a liquid crystal device in accordance with claim 1, further comprising the step of providing a liquid crystal material adjacent the alignment layer.

5. A method of manufacturing a liquid crystal device in accordance with claim 1, wherein said exposing step comprises the steps of:
   exposing a first portion of the alignment layer to said light obliquely incident onto the surface of the alignment layer; and
   exposing a second portion of the alignment layer to said light obliquely incident onto the surface of the alignment layer, said first and second portions being different from one another.

6. A method of manufacturing a liquid crystal device in accordance with claim 1, wherein said exposing step comprises the steps of:
   exposing a first portion of the alignment layer to said light obliquely incident onto the surface of the alignment layer while preventing a second portion of the alignment layer from being exposed to said light, said second portion being different than the first portion; and
   exposing said second portion of the alignment layer to said light obliquely incident onto the surface of the alignment layer while preventing said first portion from being exposed to said light.

7. A method of manufacturing a liquid crystal device in accordance with claim 1, wherein said exposing step comprises the steps of exposing a first portion of the alignment layer to said light obliquely incident onto the surface of the alignment layer while preventing a second, third and fourth portions of the alignment layer from being exposed to said light, said first, second, third and fourth portions being different from one another;
   exposing said second portion of alignment layer to said light while preventing the first, third, and fourth portions of the alignment layer from being exposed to said light;
   exposing said third portion of the alignment layer to said light while preventing the first, second and fourth portions of the alignment layer from being exposed to said light; and
   exposing said fourth portion of the alignment layer to said light while preventing the first, second and third portions of the alignment layer from being exposed to said light.

8. A method of manufacturing a liquid crystal device in accordance with claim 1, wherein said light includes ultra-violet light.

9. A method of manufacturing a liquid crystal device in accordance with claim 4, wherein the liquid crystal material has a pretilt angle greater than 60°.

10. A method of manufacturing a liquid crystal device in accordance with claim 4, wherein the liquid crystal material has a pretilt angle smaller than 10°.

11. A method of manufacturing a liquid crystal device in accordance with claim 4, wherein the liquid crystal material includes a negative dielectric anisotropy.

12. A method of manufacturing a liquid crystal device in accordance with claim 4, wherein the liquid crystal material includes a positive dielectric anisotropy.

13. A method of manufacturing a liquid crystal display device, comprising:
   providing an alignment layer on a substrate;
   exposing said alignment layer to light obliquely incident onto a surface of said alignment layer, the exposing step comprising:
      exposing a first portion of the alignment layer to said light obliquely incident onto the surface of the alignment layer; and
      exposing a second portion of the alignment layer to said light obliquely incident onto the surface of the alignment layer, said first and second portions being different from one another; and
   providing a liquid crystal material adjacent each of said exposed first and second portions of the alignment layer, the liquid crystal material adjacent the first portion of the alignment layer having a first pretilt and the liquid crystal material adjacent the second portion of the alignment layer having a second pretilt different than said first pretilt.

14. A method of manufacturing a liquid crystal display device, comprising:

providing an alignment layer on a substrate;

exposing said alignment layer to light obliquely incident onto a surface of said alignment layer, the exposing step comprising:

exposing a first portion of the alignment layer to said light obliquely incident onto the surface of the alignment layer; and exposing a second portion of the alignment layer to said light obliquely incident onto the surface of the alignment layer, said first and second portions being different from one another; and providing a liquid crystal material adjacent a respective one of said exposed first and second portions of the alignment layer, the liquid crystal material adjacent the first portion of the alignment layer having a first pretilt and the liquid crystal material adjacent the second portion of the alignment layer having a second pretilt substantially perpendicular to said first pretilt.

15. A method of manufacturing a liquid crystal device in accordance with claim 5, further comprising the steps of:

exposing a third portion of the alignment layer to said light obliquely incident onto the surface of the alignment layer; and exposing a fourth portion of the alignment layer to said light obliquely incident onto the surface of the alignment layer, said first, second, third and fourth portions being different from one another.

16. A method of manufacturing a liquid crystal device in accordance with claim 15, further comprising providing a liquid crystal material adjacent each of said exposed first, second, third and fourth portions of the alignment layer, the liquid crystal material adjacent one of the first, second, third and fourth portions of the alignment layer having a pretilt angle direction different than the pretilt angle direction of the liquid crystal material adjacent at least one of another of the first, second, third and fourth portions of the alignment layer.

17. A method of manufacturing a liquid crystal device in accordance with claim 15, further comprising providing a liquid crystal material adjacent each of said exposed first, second, third and fourth portions of the alignment layer, the liquid crystal material adjacent one of the first, second, third and fourth portions of the alignment layer having a pretilt angle direction substantially perpendicular to the pretilt angle direction of the liquid crystal material adjacent at least one of another of the first, second, third and fourth portions of the alignment layer.

18. The method according to claim 1, wherein the alignment layer is exposed to an unpolarized light.

19. The method according to claim 1, wherein the alignment layer is exposed to a partially polarized light.

20. A method of manufacturing a liquid crystal display device, comprising:

providing an alignment layer on a substrate;

exposing said alignment layer only once to light obliquely incident onto a surface of said alignment layer to form a pretilt angle, the exposing step simultaneously selecting a direction of the pretilt angle and an amount of the pretilt angle; and providing a liquid crystal material adjacent the alignment layer.

21. The method according to claim 20, wherein the alignment layer is exposed to an unpolarized light.

22. The method according to claim 20, wherein the alignment layer is exposed to a partially polarized light.

23. The method according to claim 20, wherein the liquid crystal display device is a multi-domain liquid crystal display device.

* * * * *